US007513237B1

(12) United States Patent
Liebert

(10) Patent No.: US 7,513,237 B1
(45) Date of Patent: Apr. 7, 2009

(54) ENGINE AND METHODS OF MANUFACTURING AN ENGINE WITH INCREASED INTERNAL SUPPORT

(75) Inventor: Jeffrey W. Liebert, New Salisbury, IN (US)

(73) Assignee: Electromechanical Research Laboratories, Inc., New Albany, IN (US)

( * ) Notice: Subject to any disclaimer, the term of this patent is extended or adjusted under 35 U.S.C. 154(b) by 0 days.

(21) Appl. No.: 11/763,718

(22) Filed: Jun. 15, 2007

Related U.S. Application Data

(60) Provisional application No. 60/804,958, filed on Jun. 16, 2006.

(51) Int. Cl.
*F02F 7/00* (2006.01)
*B23P 6/00* (2006.01)
*B22D 19/00* (2006.01)

(52) U.S. Cl. ............................... 123/195 H; 123/41.74; 29/888.011; 164/98

(58) Field of Classification Search .............. 123/41.72, 123/41.74, 195 R, 195 H; 29/888.011; 164/98
See application file for complete search history.

(56) References Cited

U.S. PATENT DOCUMENTS 2,334,731 A * 11/1943 Szekely .................. 123/41.74
4,470,376 A * 9/1984 Hayashi .................. 123/41.74
4,771,747 A 9/1988 Ballheimer et al.
4,831,978 A 5/1989 Iguchi et al.
4,911,118 A 3/1990 Kageyama et al.
RE33,575 E 4/1991 Ballheimer et al.
6,928,974 B1 8/2005 Markou
2004/0231630 A1 11/2004 Liebert
2006/0096555 A1 5/2006 Buck
2006/0249116 A1 11/2006 Liebert

FOREIGN PATENT DOCUMENTS

JP 56023345 A * 3/1981

* cited by examiner

*Primary Examiner*—Noah Kamen
(74) *Attorney, Agent, or Firm*—Finnegan, Henderson, Farabow, Garrett & Dunner, L.L.P.

(57) ABSTRACT

Support members for a reciprocating piston internal combustion engine are disclosed. Embodiments include an engine block with support members extending between portions of the cylinder cavity and/or enhancing coolant flow for cooling the combustion cylinders. Also disclosed are support members for connection to the side walls of the cylinder cavity and support members with ears and/or holes to enhance combustion cylinder cooling. Further disclosed are methods for modifying an internal combustion engine to increase its internal support and/or cooling.

35 Claims, 13 Drawing Sheets

ENGINE AND METHODS OF MANUFACTURING AN ENGINE WITH INCREASED INTERNAL SUPPORT

This application claims the benefit of U.S. Provisional Application No. 60/804,958, filed Jun. 16, 2006, the entirety of which is hereby incorporated by reference.

FIELD OF THE INVENTION

This invention relates generally to internal combustion engines, and more particularly to internal combustion engines with increased internal support and methods for manufacturing the engines with increased internal support. This invention includes modifying an existing engine to add the increased internal support as well as originally casting or originally manufacturing an engine with the increased internal support.

BACKGROUND OF THE INVENTION

A traditional type of internal combustion engine utilizes a cylinder and reciprocating piston arrangement. A variable-size combustion chamber is typically formed with a cylinder that is effectively closed at one end and has a moveable piston at the other end. A combustible gas, or mixture of a combustible fluid and air, is introduced into the combustion chamber and then typically compressed by the piston and ignited. The ignited gas, or mixture, exerts a force on the piston in the direction that increases the volume of the combustion chamber. The linear movement of the moving piston is then converted to rotational movement by connecting the piston on a crankshaft.

A typical reciprocating piston internal combustion engine design includes an engine block, also referred to as a cylinder block, which encases the combustion cylinders. Many engine block designs utilize material, for example aluminum, that is not well-suited for use as the internal walls of the combustion cylinders. As such, cylinder sleeves, also referred to as cylinder liners and commonly fabricated from a material more suitable to withstand the environment associated with the combustion chamber, are used to define the interior portion of the combustion cylinders and the combustion cylinder internal walls. Frequently, cylinder sleeves made of iron and are fixed in cylinder cans cast as part of the engine block and made of aluminum.

Many modern internal combustion engines include multiple cylinders, which are frequently arranged in one or more rows. Where multiple rows are used, the engine block is typically provided with two or more banks of cylinders, where each bank of cylinders includes a number of cylinders arranged in a row.

Frequently, the combustion cylinders are located in a cylinder cavity, which may be referred to as a coolant chamber when configured and adapted to circulate coolant. Engines designed to operate for extended periods, for example grater than approximately one minute, are typically manufactured with at least one coolant chamber surrounding the cylinder sleeves. The coolant chamber allows liquid coolant to circulate around and cool the cylinder sleeves.

Engines designed to operate for short periods may not include coolant chambers, thereby relying on the short period of operation to limit the total heat generated and prevent overheating and permanent deformation of the engine. Typically, engines with one or more coolant chambers are referred to as "wet block" engines, while engines without at least one coolant chamber are referred to as "solid block" engines. Most modern internal combustion engines that operate for extended periods, for example engines used in automobiles, watercraft and light civil aircraft, are wet block type engines. Engines used for high performance over a short period of time, such as those used in drag racing or tractor pulls, are frequency solid block type engines.

In a wet block type engine, a cavity for circulating coolant, also refereed to as the "water cavity," surrounds the cylinder sleeves. Many wet block engines have the cylinders arranged in rows. While this configuration provides a number of advantages, a disadvantage with at least this arrangement is that the water cavity and the engine block are susceptible to deformation, especially when large amounts of torque or horsepower are generated. Deformation of the water cavity and the engine block can result in a host of undesirable outcomes, for example, deformation of the cylinder sleeves, fluid leakage, loss of compression, increased friction and engine seizure.

Many automobile enthusiasts are interested in increasing the torque and/or horsepower produced by commercially available stock engines. Methods by which this goal is accomplished include increasing the bore and/or stroke of the engine cylinders, adding a turbocharger, adding a supercharger, and adding a nitrous-oxide ($N_2O$) injection system. Although changing the bore and/or stroke of the engine is frequently a very effective way to increase the engine's output, it can be relatively expensive compared to the other example methods, both in terms of time and money spent making the modification. Apparatuses useful in increasing the bore and/or stroke of an engine and method for this type of modification are disclosed in co-pending U.S. patent application No. 10/624,876, filed Jul. 22, 2003 and U.S. patent application No. 11/459,750, filed Jul. 25, 2006, and U.S. Provisional patent application No. 60/472,589, filed May 22, 2003, the entireties of which are incorporated by reference.

Due to their relative simplicity and lower cost, many automobile enthusiasts modify their stock engines to increase output using turbocharger, supercharger, or nitrous-oxide techniques. However, when the output of the stock engine is increased, the unmodified engine block is susceptible to deforming under the increased stresses that result, and problems develop. These problems include head gasket leaks, cylinder sleeve deformation, increased engine wear, loss of power and possible engine seizure. Even seemingly small leaks or slight deformation in the cylinder sleeves can have undesirable outcomes. As an example of the extent to which designers and manufactures of high performance engines will go in an attempt to minimize the adverse effect of cylinder sleeve deformation NASCAR® engineers hone their cylinders in a hot, approximately 240° F., oil bath to approximate normal operating conditions.

Difficulties with structural engine strength is not limited to performance automobiles, major automobile manufacturers have also had difficulties with the strength of their stock engine blocks. For example, Mercedes® and Honda® have used their engines as stress members in their automobiles with suspension mounts attached directly to the engine block. These attempts generally resulted in the engines failing due to their inability to carry the stress loads without deforming. One common problem included the deformation of the cylinder sleeves while the engine was running.

As such, there is a need in the industry to provide an improved internal combustion engine that resists deforming. More particularly, there is a need for an improved wet block engine with additional strength in the area surrounding the cylinder sleeves, and especially when the engine is developing high torque and/or power. There is also a need in the industry for a method to modify existing engines to increase their ability to resist deforming, especially in the area surrounding the cylinder sleeves, and especially when the engine is developing high power and/or torque.

The present invention addresses these needs and others, at least in part, by providing an internal combustion engine with an improved support structure. The present invention further provides a method for manufacturing such an engine, and a method for modifying existing engines to include additional support structure.

SUMMARY OF THE INVENTION

It is an object of embodiment of the present invention to provide an improved engine and methods of manufacturing an engine with increased internal support.

In accordance with an aspect of an embodiment of the present invention, an engine block for a reciprocating piston internal combustion engine with cylinder sleeves is provided. The engine block includes an upper deck for attaching an engine head, the upper deck defining a plane. The engine block also includes a cylinder cavity wall below the upper deck plane and surrounding first and second cylinder sleeve locations, where the first and second sleeve locations are at least partially spaced apart, and where a cylinder sleeve is retained in and individually coextensive with the first and second sleeve locations when the cylinder sleeves are attached to the engine block. The engine block further includes a first cylinder cavity cross member extending between the first and second sleeve locations, the first cross member including portions of the cylinder cavity wall, and where the first cross member enables coolant flow between the first and second sleeve locations.

In accordance with another aspect of an embodiment of the present invention, an improvement in an engine block for a reciprocating piston internal combustion engine, where the engine block includes an upper deck with an elongated upwardly-opening cylinder cavity including a generally upstanding wall surrounding at least two combustion cylinders, the wall having an upper end portion, a lower end portion, and side portions is provided. The improvement includes a first transverse support wall between the upper and lower end portions and extending from a first side portion of the side wall, between the combustion cylinders, and to a second side portion of the side wall facing the first side portion, the support wall providing a rigid connection between the first and second side wall portions.

In accordance with still another aspect of an embodiment of the present invention, an apparatus for internally supporting an engine block for a reciprocating piston internal combustion engine, where the engine block includes an upper deck and a coolant chamber, the upper deck defining an upper plane and the coolant chamber including a side wall surrounding at least one cylinder sleeve, where the cylinder sleeve has a lower surface defining a lower plane substantially parallel to the upper plane is provided. The apparatus including a first support member with two connection portions, where the connection portions are configured and adapted to connect the first support member to two spaced apart coolant chamber side wall portions. The two spaced apart coolant chamber side wall portions are located at least in part between the upper plane and the lower plane, and the first support member structurally connects the two spaced apart coolant chamber side wall portions when the connection portions are connected to the two spaced apart coolant chamber side wall portions.

In accordance with yet a further aspect of an embodiment of the present invention, a method for modifying a reciprocating piston internal combustion engine block with a cylinder cavity, a cylinder cavity side wall, and an upper deck, the cylinder cavity side wall surrounding at least two combustion cylinders and the upper deck configured for connection to an engine head is provided. The method includes attaching a support member first attachment surface to a first cylinder cavity side wall portion, where the support member further includes a support member second attachment surface. The method also includes attaching the support member second attachment surface to a second cylinder cavity side wall portion different from the first cylinder cavity side wall portion. The method further includes attaching at least two cylinder sleeves to the engine block, where the at least two cylinder sleeves are separated at least in part by the support member.

This summary is provided to introduce a selection of the concepts that are described in further detail in the detailed description and drawings contained herein. This summary is not intended to identify any primary or essential features of the claimed subject matter, nor is it intended to be used as an aid in determining the scope of the appended claims. Each embodiment described herein is not intended to address every object described herein and each embodiment does not include each feature described. Other forms, embodiments, objects, advantages, benefits, features and aspects of the present invention will become apparent to one of skill in the art from the detailed description and drawings contained herein.

DESCRIPTION OF THE ILLUSTRATED EMBODIMENTS

Figure 1:
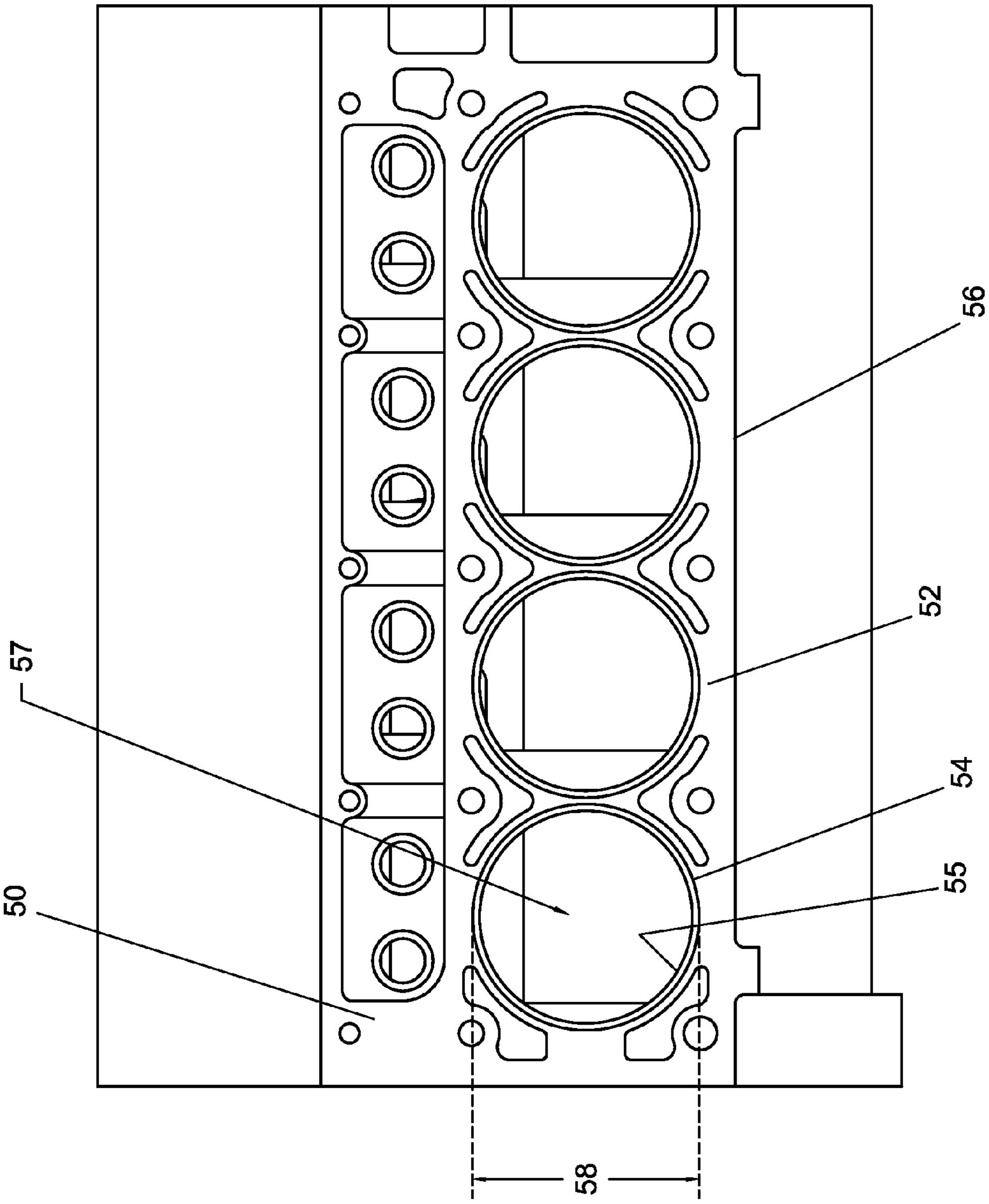
fig. 1 (prior art)
FIG. 1 is a perspective view of a prior art closed deck V-8 engine block.

For the purposes of promoting an understanding of the principles of the invention, reference will now be made to the embodiments illustrated in the drawings and specific language will be used to describe the same. It will nevertheless be understood that no limitation of the scope of the invention is hereby intended, such alterations and further modifications in the illustrated devices, and such further applications of the principles of the invention as illustrated herein being contemplated as would normally occur to one skilled in the art to which the invention relates. At least one embodiment of the invention is shown in great detail, although it will be apparent to those skilled in the relevant art that some features that are not relevant to the present invention may not be shown for the sake of clarity.

Depicted in FIG. 1 is a stock, closed deck, wet block type engine block 50. The stock engine block 50 includes an upper deck 52, cylinder cans 54, cylinder sleeves 55, and an engine mount surface 56. One characteristic of engine block 50 is that gravity acts to keep the liquid coolant circulating in the cylinder cavity that surrounds cylinder can 54 toward the bottom of the cylinder can 54 and away from upper deck 52. Another characteristic of engine block 50 is that its upper surface (upper deck 52) is not continuous and has large open areas, such as the cylinder cavity openings 57 in upper deck 52 where the cylinder sleeves are inserted, each opening 57 having a diameter 58. These open areas decrease the strength of the upper deck 52 and engine block 50 subjecting the cylinder cans 54 and cylinder sleeves 55 to many of the forces imparted to engine block 50 during operation. For example, many of the forces exerted on engine mount surface 56 by the engine mounts will be imparted to the cylinder cans 54 and the cylinder sleeves 55.

A sufficiently large amount of force will cause the cylinder sleeves 55 to go out of round and/or the upper deck 52 to deform, resulting in a number of undesirable situations, for example, increased friction, increased wear, fluid leakage, and engine seizure. Some unmodified stock engines are capable of producing sufficient force to deform the cylinder cans 54, the upper deck 52, or both the cylinder cans 54 and the upper deck 52 when generating high output, although most engine manufactures strive to avoid this type of problem. Additionally, many automobile enthusiasts modify their engines to increase the engine's output above that produced by the stock engine, which can also result in the modified engine producing sufficient force to deform the cylinder cans 54, the upper deck 52, or both the cylinder cans 54 and the upper deck 52. Typical methods used by automobile enthusiasts to increase power include adding a turbocharger, supercharger, or nitrous-oxide injection system.

Figure 2:
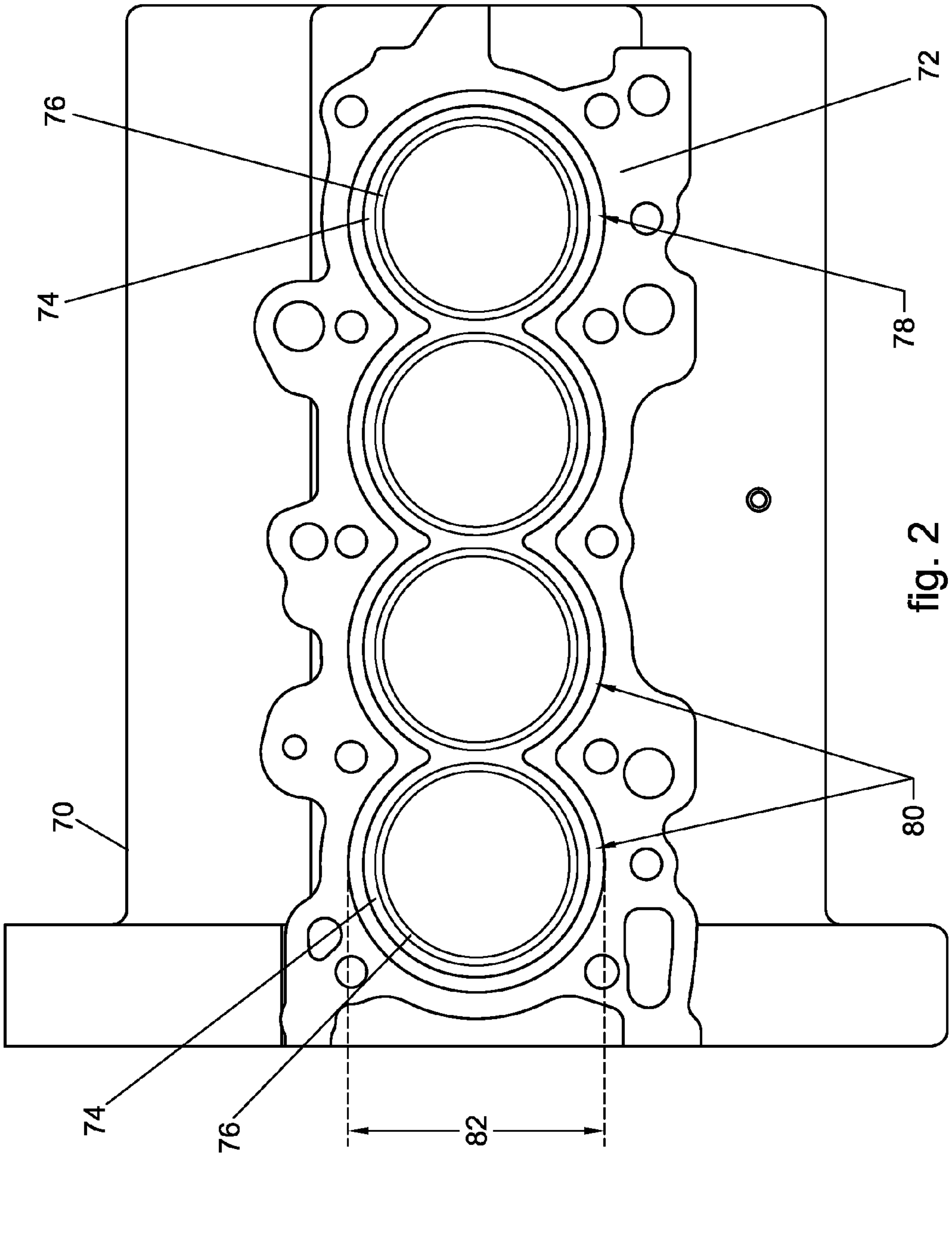
fig. 2 (prior art)
FIG. 2 is a perspective view of a prior art open deck inline-4 engine block.

To help avoid the possibility of the cylinder cans 54 going out of round, many engine manufactures use an open deck design in which the cylinder sleeves and/or cylinder cans are not connected to the upper deck. Depicted in FIG. 2 is a stock, open deck, wet block type engine block 70. The stock engine block 70 includes an upper deck 72, cylinder cans 74, and cylinder sleeves 76. Also depicted in FIG. 2 is cylinder cavity 78, in which cooling fluid circulates to keep the cylinder sleeves 76 from overheating and deforming. Open deck engines are characterized in that there is a gap 80 between the top of the cylinder can 74 and the upper deck 72. With the cylinder cans 74 and the cylinder sleeves 76 not connected to the upper deck 72, the upper deck 72 can flex and deform in response to stresses without transmitting these stresses to the cylinder sleeves 76.

Open deck designs are typical with aluminum block engines to minimize the stress exerted on the cylinder sleeves and allow the cylinder sleeves to remain round. However, one drawback to the open deck engine design is that in order to have a gap 80 between the cylinder can 74 and the upper deck 72, the diameter 82 of the cylinder cavity opening in upper deck 72 is larger than it would be with a closed deck engine design and further weakens the open deck engine block 70's overall ability to withstand stress without deforming. This weakness increases the likelihood of the engine block 70 and upper deck 72 deforming, which can result in a number of undesirable outcomes for example, leaking coolant or lubrication fluid, or loss of combustion chamber pressure if the deformation is sufficiently severe to affect the seal between the cylinder sleeve, the head gasket, and the engine head.

Figure 3:
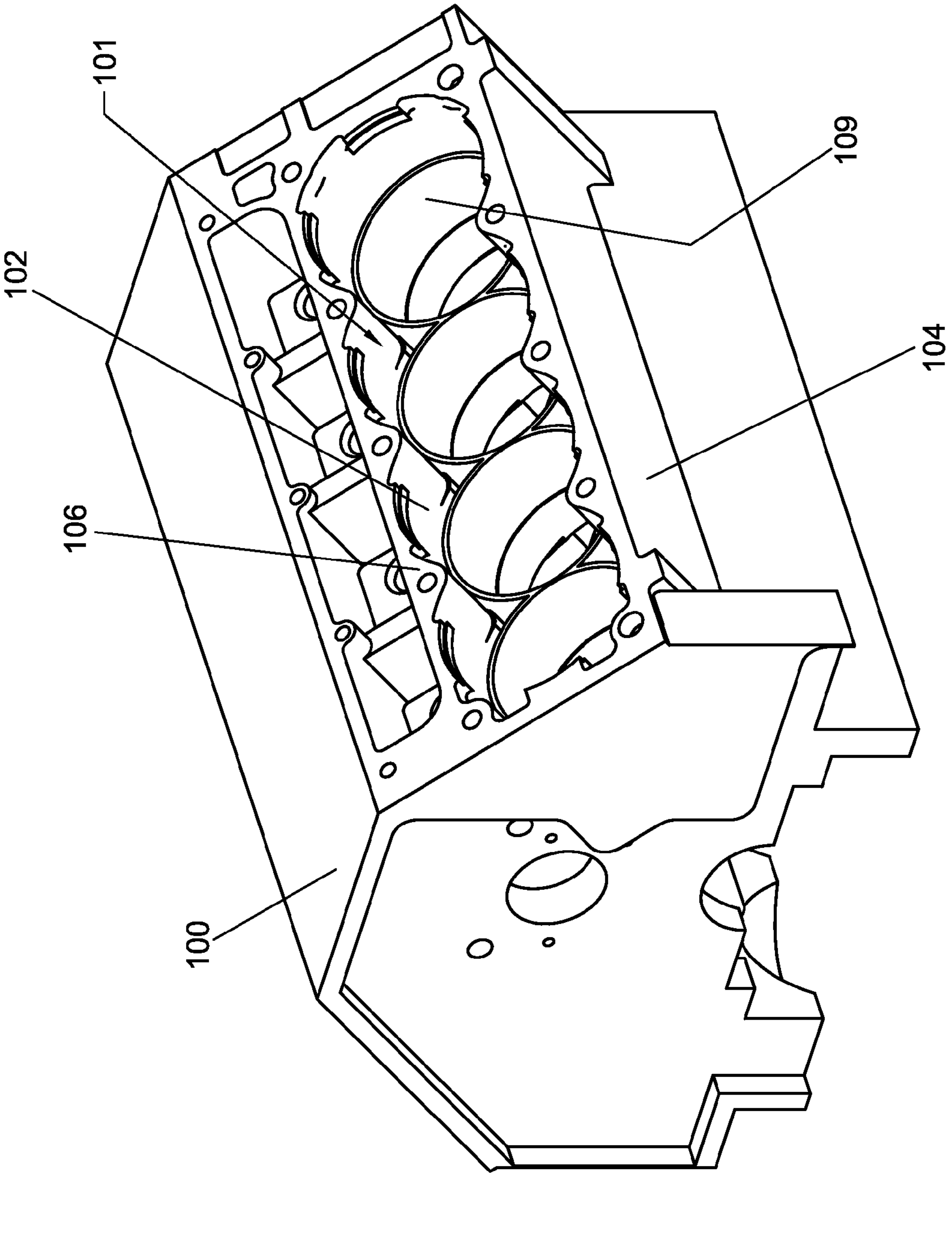
FIG. 3 is a perspective view of an engine block according to one embodiment of the present invention.
Figure 4:
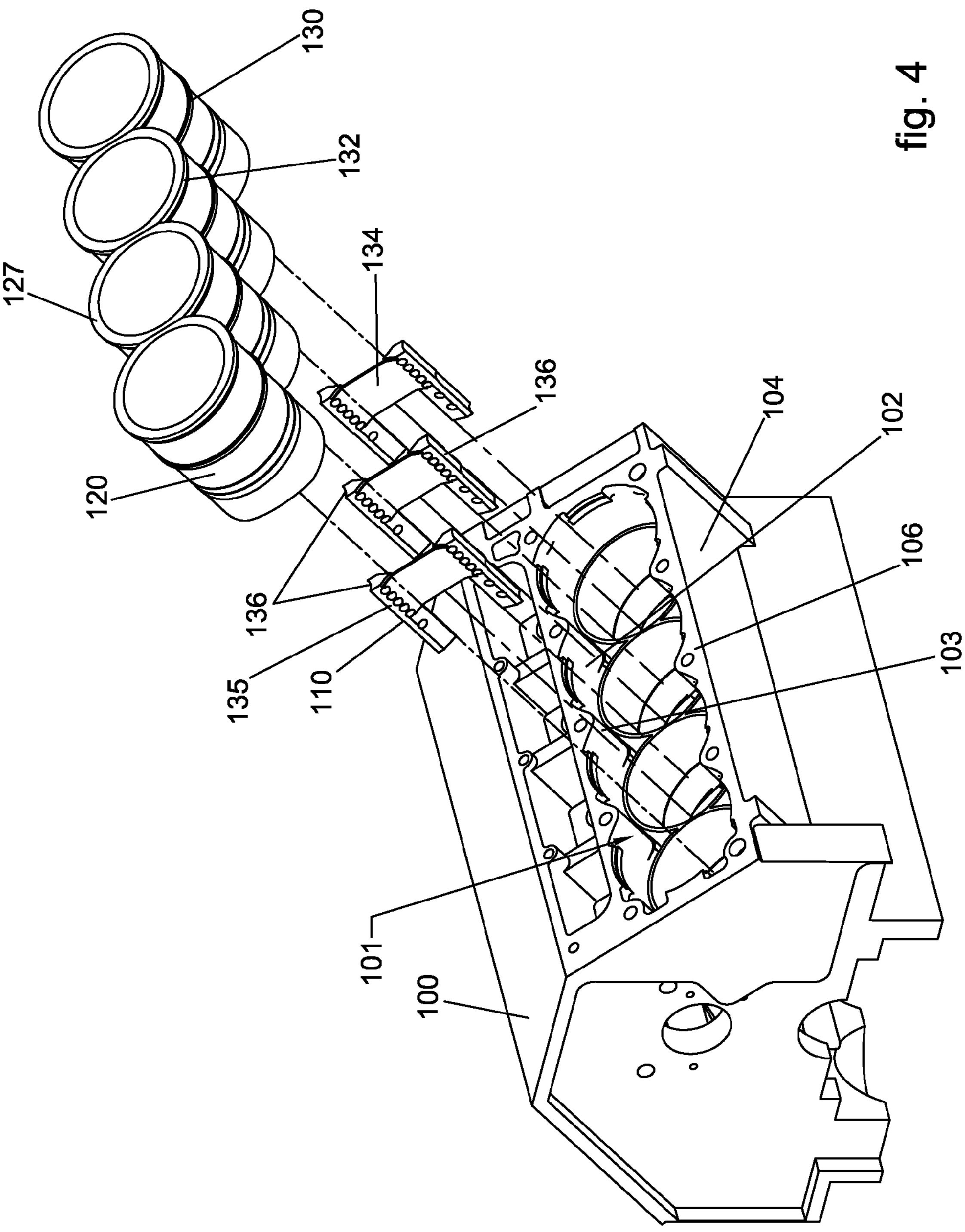
FIG. 4 is an exploded perspective view of the engine block depicted in FIG. 3, support members and cylinder sleeves according to one embodiment of the present invention.

Depicted in FIG. 3 is a modified engine block 100 with portions of upper deck 106 and cylinder cans 109 removed. Removing portions of the upper deck 106 may be done for various reasons, such as replacing the stock cylinder sleeves with larger cylinder sleeves or cylinder sleeves made of different material, and may be accomplished in various ways, such as precisely boring portions of engine block 100. Another reason to remove portions of the upper deck 106 is to facilitate insertion of support members according to one embodiment of the present invention. With portions of the upper deck 106 and cylinder cans 109 removed, it can be seen that the cylinder cavity 101 encloses the group of cylinder cans 109 in one bank. In the illustrated example, cylinder cavity 101 is a coolant chamber adapted to contain and circulate liquid coolant in the space between the walls of cylinder cavity 101 and the cylinder cans 109 and/or cylinder sleeves 120 to cool the engine, and in particular to cool cylinder cans 109 and cylinder sleeves 120 (FIG. 4). In the illustrated example of cylinder cavity 101 is a single elongated cavity with a side wall 102. The stock engine block 50 depicted in FIG. 1 may be converted to the modified engine block 100 by, for example, mechanically boring portions of upper deck 52, cylinder cans 54 and cylinder sleeves 55.

Similar to stock engine block 50, gravity acts to keep the liquid coolant toward the bottom of the cylinder cans 109 and away from the upper deck 106 and the top of the cylinder cans 109 where the highest temperatures typically occur. Also similar to stock engine block 50, stresses from the engine mounts are transmitted through the upper deck 106 and through the cylinder cans 109. However, with the size of upper deck 106 surrounding the periphery of the cylinder cavity 101 being smaller, the engine block 100 is more susceptible to deformation, which may result in the cylinder cans 109 and the inserted cylinder sleeves 120 (FIG. 4) being subject to additional stresses. However, the cylinder cans 109 and the inserted cylinder sleeves 120 are typically not well suited to carry these additional loads, and deformation in these members may occur resulting in possible leakage of combustion chamber gas, lubricating fluids, or cooling fluids, as well as increased friction and wear inside the combustion chamber.

Figure 5:
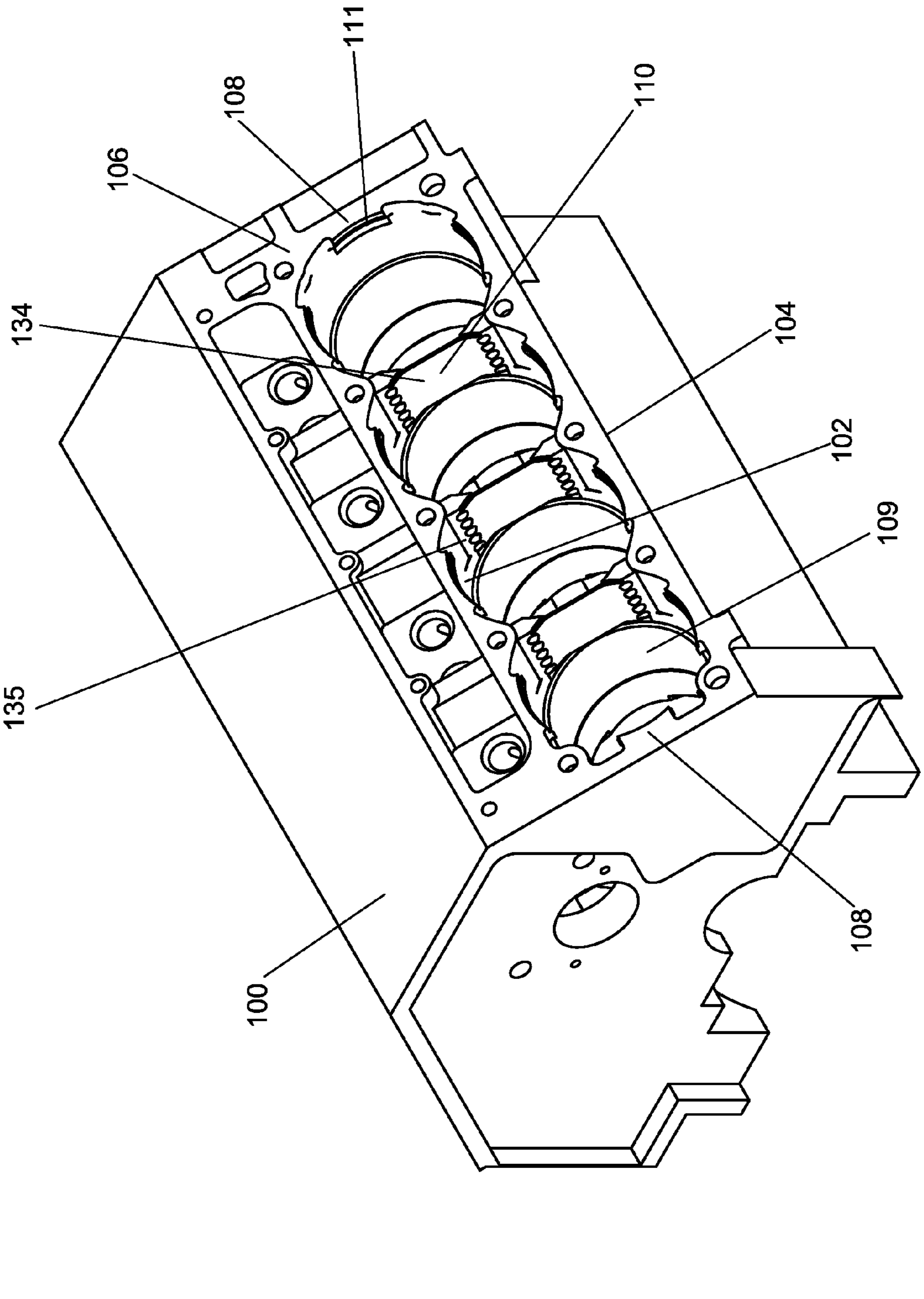
FIG. 5 is a perspective view of the engine block depicted in FIG. 3 with support members inserted.
Figure 6:
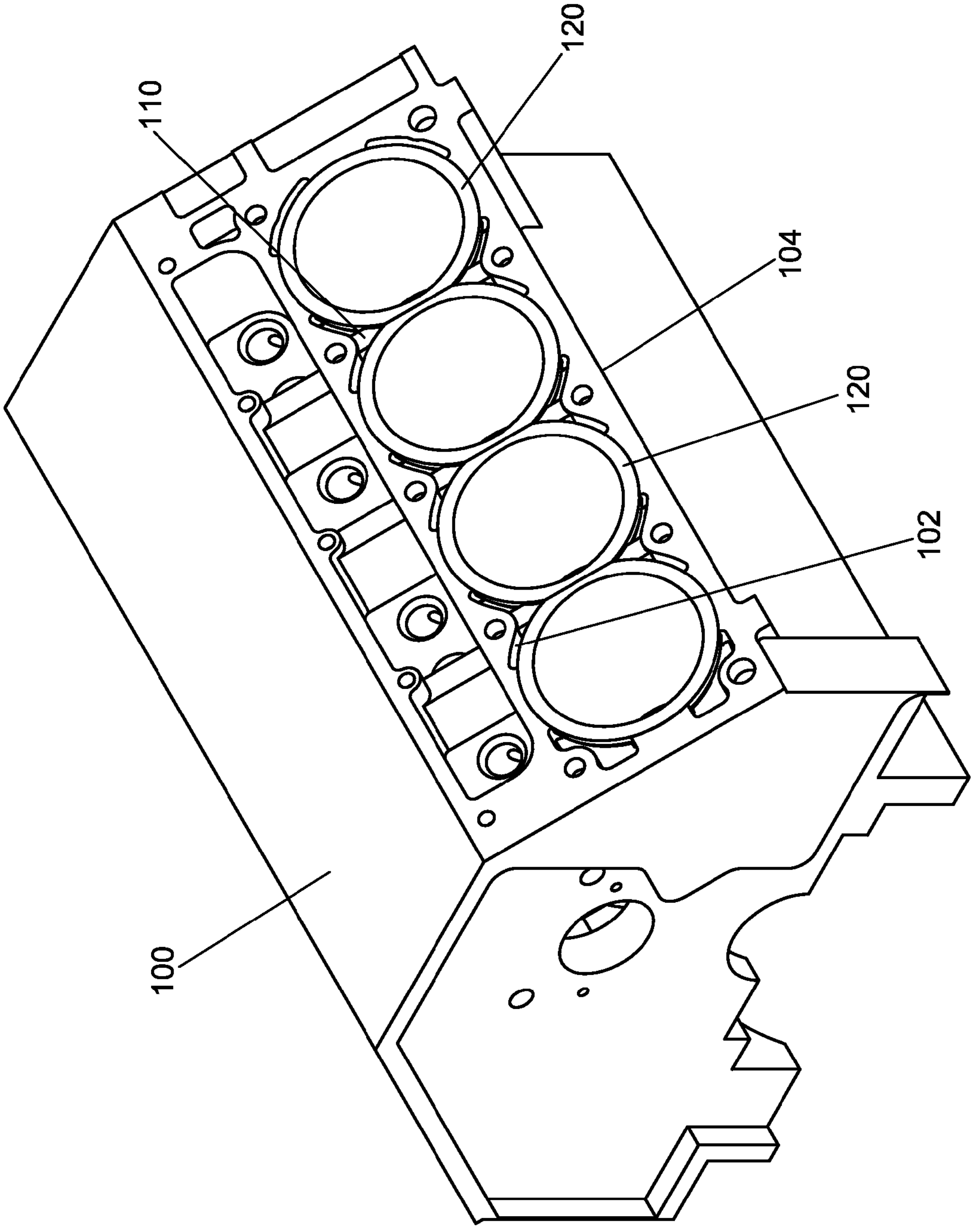
FIG. 6 is a perspective view of the engine block depicted in FIG. 3 with support members and cylinder sleeves inserted.

Depicted in FIG. 4 is an exploded perspective view of the engine block 100 with cylinder sleeves 120 and support members for strengthening cylinder cavity 101 and engine block 100, for example trusses 110. Cylinder sleeves 120 include upper surfaces 127, lower cylinder sleeve flanges 130, upper cylinder sleeve flanges 132. In FIGS. 5 and 6, truss 110 includes truss cross members 134, connection portions 135, and attachment surfaces 136. One or more trusses 110 are inserted between spaced apart portions of the side wall 102 of cylinder cavity 101. When the trusses 110 are attached to the side wall 102 of cylinder cavity 101, the elongated portion of the cylinder cavity 101 that were previously not interconnected become interconnected, thereby strengthening the engine block 100. With the trusses 110 inserted, the stresses imparted to the engine block 100 through the engine mount surface 104 are carried through the trusses 110, thereby decreasing the amount of stress that is carried by the cylinder cans 109 and the cylinder sleeves 120.

Engine block 100 is a "V-type" engine design, frequently referred to as a "V-8," with a second cylinder cavity 101 and bank of cylinders similar to those depicted in FIGS. 4-6 on a portion of the engine block 100 hidden from view. With the trusses 110 installed in both cylinder cavities 101, each of the engine mount surfaces 104, which are located adjacent each bank of cylinders, are more rigidly connected and tied together across the entire engine block. The increased strength realized by this configuration increases the engine block 100's ability to resist deformation, decreases the distortion of the upper deck 106 and cylinder sleeves 120, and further minimizes, for example, head gasket leakage and friction generated between the pistons and cylinder sleeves 120. An example application where the addition of trusses 110 to engine block 100 is useful is in the after market engine modification industry.

Even though the trusses 110 may appear relatively thin in the region between the cylinder sleeves 120, they are capable of dramatically increasing the strength of the engine block 100. For example, the trusses 110 transmit torsional stresses in the region between the cylinder sleeves 120 and beneath the upper deck 106 rather than through the cylinder sleeves 120 and the upper deck 106. As another example, each installed truss increases the ability of the engine block 100 to resist forces attempting to pull apart portions of the side wall 102 by adding approximately 6,000 pounds of tensile resistance, totaling approximately 18,000 pounds of tensile resistance for each cylinder cavity 101.

Figure 7:
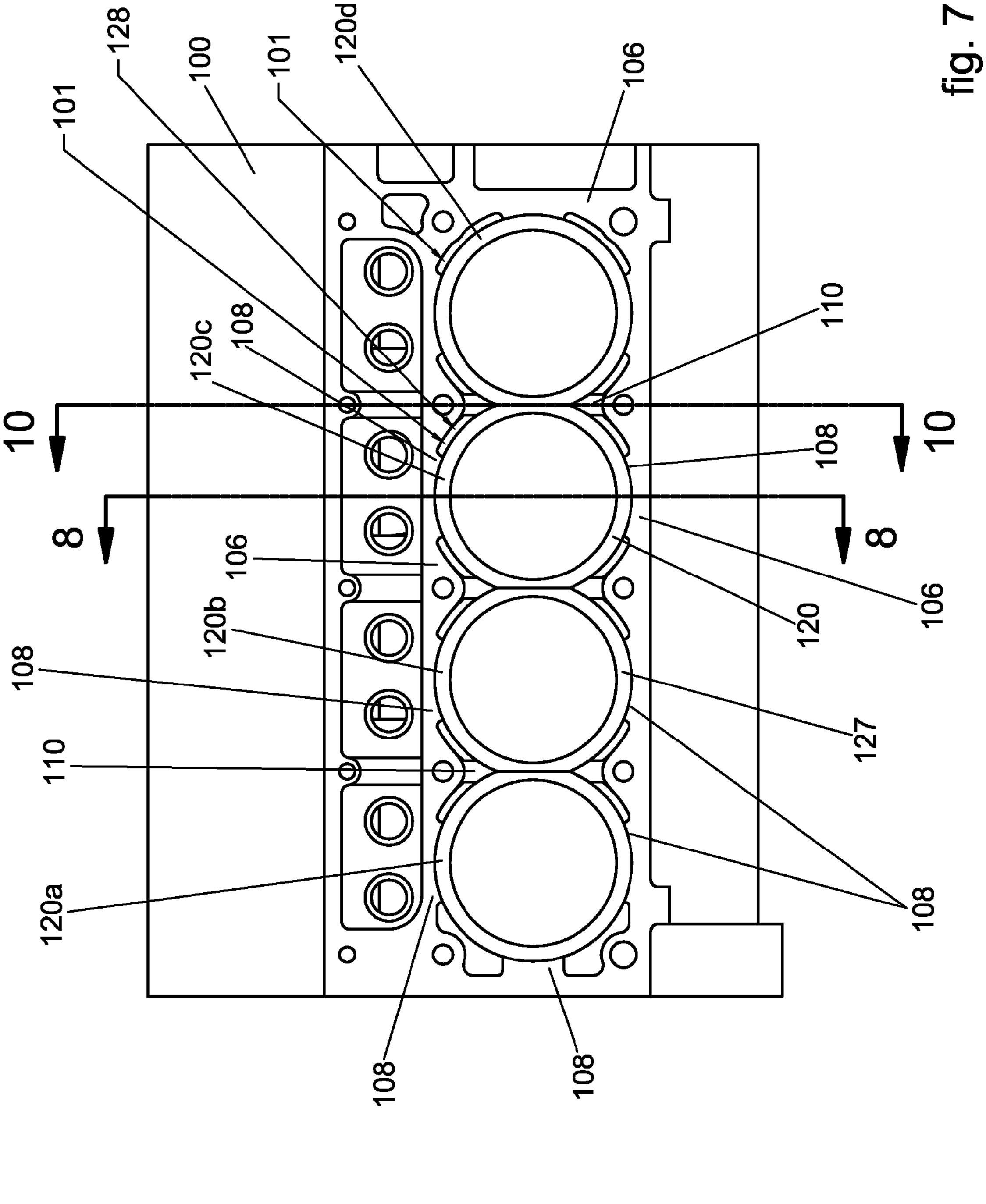
FIG. 7 is an elevational view of the engine block, support members and cylinder sleeves depicted in FIG. 6.

Referring now to FIGS. 7-10, when the stock engine block is modified, there are portions of the upper deck that are not removed and are used to form sleeve supports 108. The sleeve supports 108 each have a shelf 111 (FIGS. 8 and 9) that vertically supports the abutment surfaces 122 (FIG. 9) of the cylinder sleeves 120. The outermost cylinder sleeves 120 (cylinder sleeves 120*a* and 120*d* in FIG. 7) are each supported along the sleeve upper abutment surface 122 (FIG. 9) in three locations by three sleeve supports 108 (FIG. 7). The innermost cylinder sleeves 120 (cylinder sleeves 120*b* and 120*c* in FIG. 7) are each supported in two locations along the sleeve upper abutment surface 122 (FIG. 9) by two sleeve supports 108 (FIG. 7).

Figure 9:
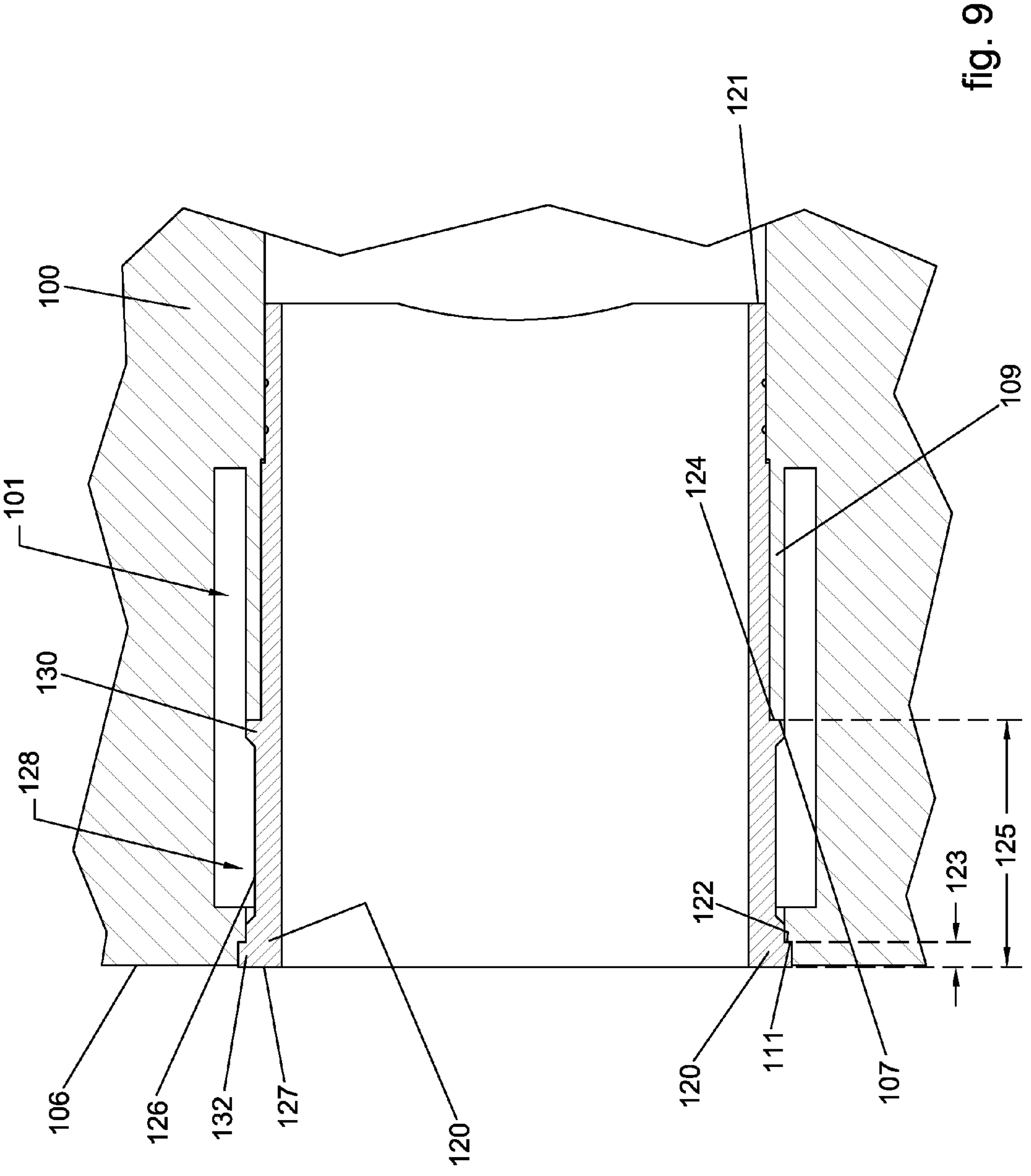
FIG. 9 is a partial sectional view of a portion of the engine block and cylinder sleeve depicted in FIG. 7.

Referring to FIG. 9, the distance 123 between the upper abutment surface 122 and the top of the cylinder sleeve 120 is approximately 0.2 inches, which is approximately one-half (½) the thickness of the upper deck 106 at the locations where the shelf 111 is formed. In other embodiments, which include different stock engines, the distance 123 may be greater than or less than 0.2 inches provided that sufficient support for cylinder sleeve 120 is provided.

Figure 10:
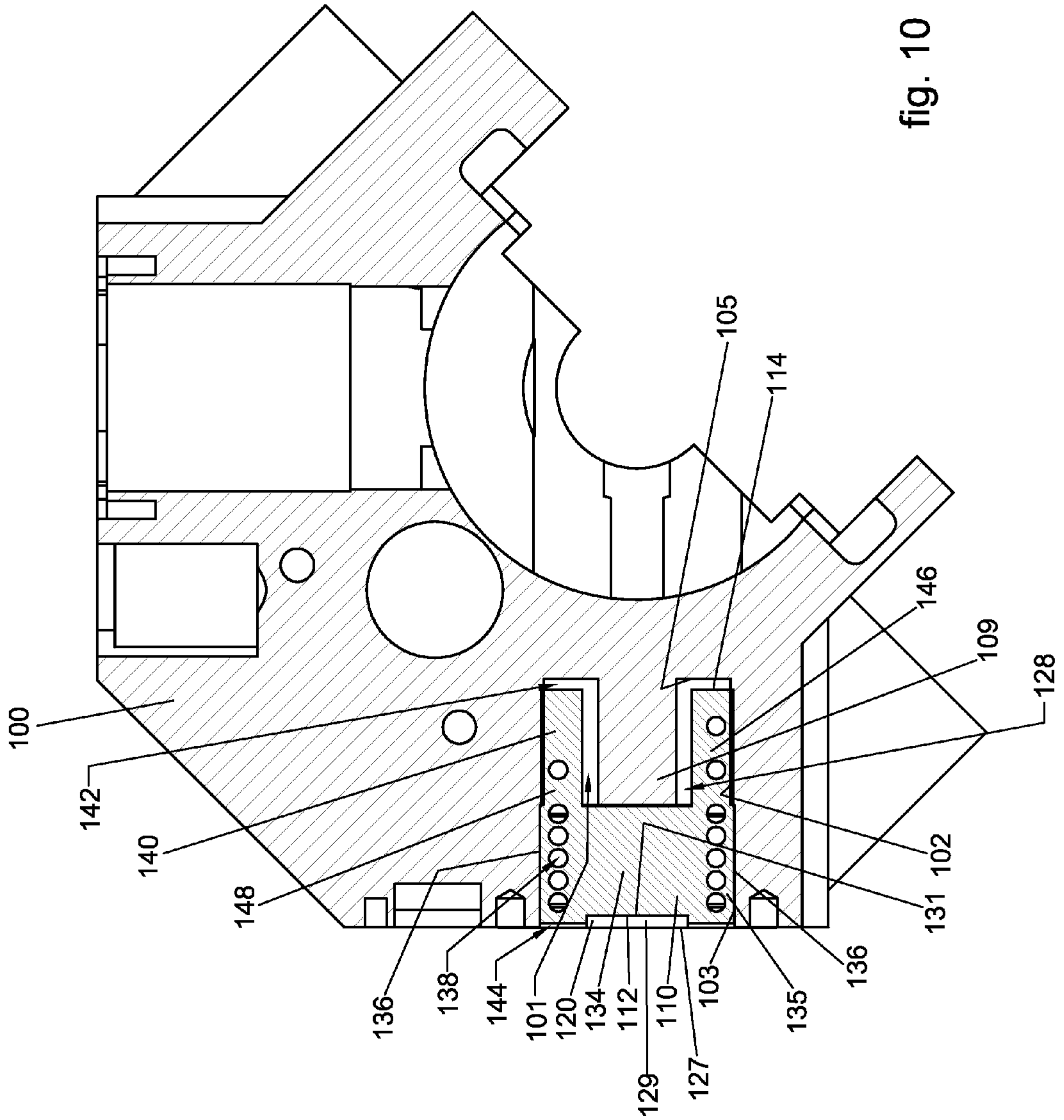
FIG. 10 is a sectional view of the embodiment depicted in FIG. 7, taken along line 10-10 of FIG. 7.

In addition to adding strength to the engine block 100, the trusses 110 add additional vertical support surfaces for the cylinder sleeves 120, labeled as support surfaces 112 in FIG. 10. Support surfaces 112 contact the bottom surfaces 131 of upper cylinder sleeve flanges 132, where the flanges 132 are modified to include sleeve side abutment surfaces 129, where the upper cylinder sleeve flanges 132 inlcude sleeve side abutment surfaces 129 that contact one another in the illustrated embodiment under normal operating conditions. As such, by adding the trusses 110, each cylinder sleeve 120 is supported at a total of four locations, vertically supporting the cylinder sleeves 120 securely against the engine head when the engine is assembled. This added support increases the assembled engine block's ability to resist deformation along the upper deck region of the engine that connects with the engine head.

Figure 8:
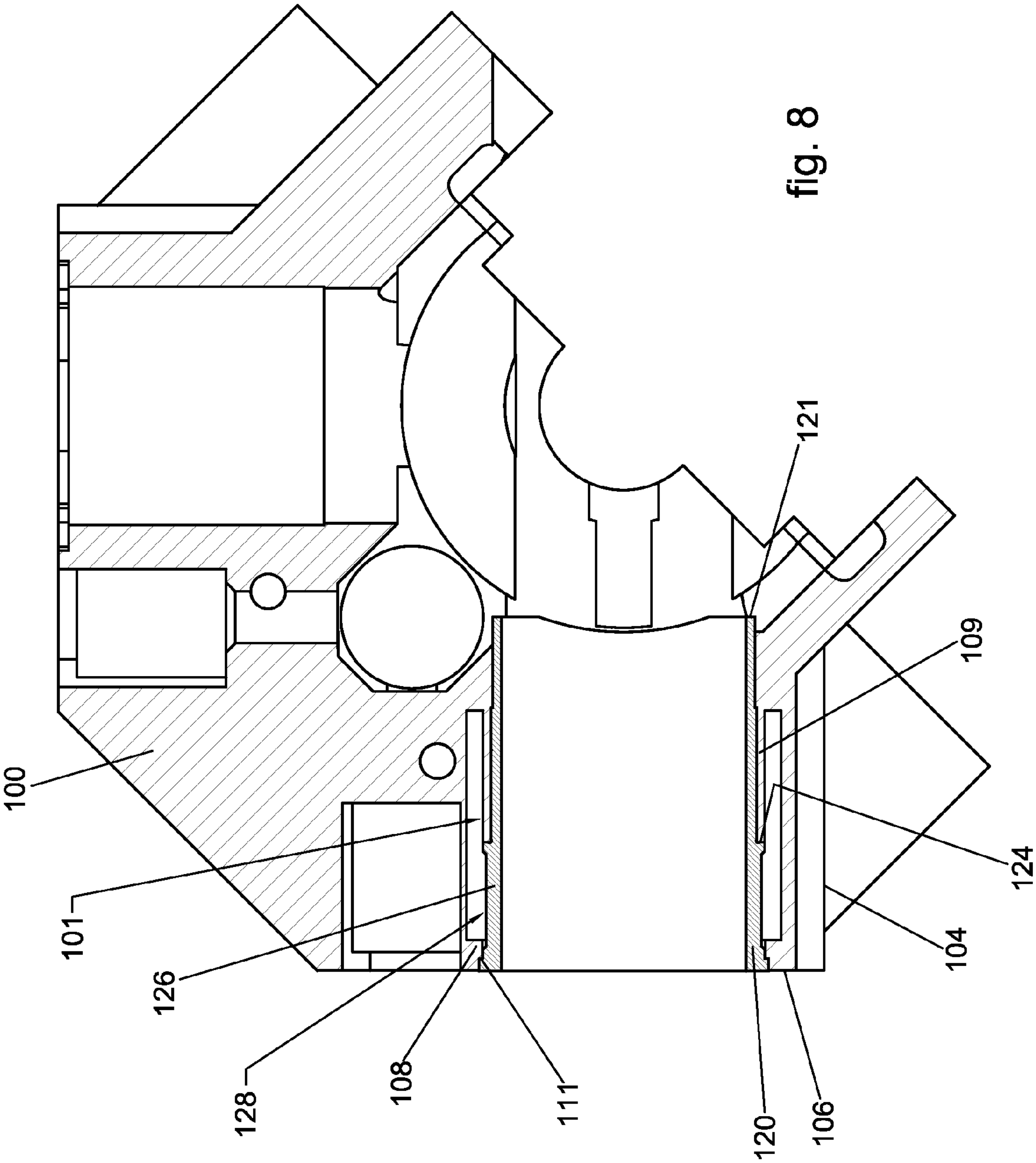
FIG. 8 is a sectional view of the embodiment depicted in FIG. 7, taken along line 8-8 of FIG. 7.

Referring now to FIGS. 8-10, cylinder sleeve 120 also includes a lower abutment surface 124 that further helps maintain the vertical position of cylinder sleeve 120 within cylinder cavity 101 (see FIG. 4) by contacting the top surface 107 (FIG. 9) of the cylinder can 109 (FIGS. 8 and 9). Top surface 107 is formed by removing the upper approximately 2.1 inches of cylinder cans 109 from the stock engine. Prior to modifying the stock engine to arrive at engine block 100, the portion of cylinder cans 109 between the upper deck 106 and approximately 2.1 inches below the upper deck 106 are spaced for coolant passage between the cylinder cans 109. Below this spaced-apart portion, the cylinder cans 109 are interconnected in a "Siamese bore" type configuration. Removing the portions of the cylinder cans 109 between the upper deck 106 and approximately 2.1 includes below the upper deck 106 provides clearance for truss 110 and truss cross member 134. The lower interconnected "Siamese bore" portion of cylinder cans 109 provides lateral support for cylinder sleeves 120 to maintain their lateral position in the engine block 100 and to, as an example in the illustrated embodiment, prevent the upper portions of cylinder sleeves 120 from spreading apart and separating the cylinder sleeve side abutment surfaces 129 (FIG. 10). As such, the distance 125 between cylinder sleeve lower abutment surface 124 and the top of cylinder sleeve 120 (FIG. 9) is approximately 2.1 inches. In alternative embodiments, distance 125 may be greater than or less than 2.1 inches to accommodate different stock engine blocks. In determining the distance 125 for alternate embodiments, various factors such as the required strength for truss cross member 134 and adequate lateral support for the cylinder sleeves 120 are considered.

Abutment surfaces 122 and 124 stabilize the cylinder sleeve 120 for axially directed thrust loads. With the two abutment surfaces 122 and 124 helping to maintain the vertical position of cylinder sleeve 120 in engine block 100, the cylinder sleeve 120 is able to withstand the enormous pressures developed when the engine head is tightly connected to the engine block 100 to contain the combustion gasses during operation.

Cylinder sleeve 120 further included a necked-down region 126 (FIG. 9) where the thickness of the upper portion of the cylinder sleeve is decreased. The necked-down region 126 is adjacent to the water cavity 128, which is the portion of cylinder cavity 101 external to cylinder sleeves 120, and enhances the cooling of the upper regions of the cylinder sleeve 120. The necked-down region 126 terminates at the bottom with flange 130, where the bottom portion of flange 130 includes the cylinder sleeve lower abutment surface 124.

When referring to a "slip-fit," also referred to as a "clearance-fit," it is understood that there is some clearance, such as a slight gap, between two items when the items are fitted together. Generally, the clearance is equal to or greater than approximately 0.0003 (three ten-thousandths) inches. Particularly, the clearance is equal to or greater than approximately 0.0005 (five ten-thousandths) inches, and more particularly, the clearance is equal to or greater than approximately 0.0005 (five ten-thousandths) inches and equal to or less than 0.0010 (one one-thousandth (ten ten-thousandths)) inches.

When referring to an "interference fit," it is understood that two items are equally dimensioned and there is neither a gap nor an overlap when items are fitted together. Generally, the tolerance (difference in dimensions) is equal to or less than approximately 0.0010 (one one-thousandth (ten ten-thousandths)) inches. Particularly, the tolerance (difference in dimensions) is equal to or less than approximately 0.0005 (five ten-thousandths) inches, and more particularly, the tolerance (difference in dimensions) is equal or less than approximately 0.0003 (three ten-thousandths) inches.

When referring to a "press-fit," it is understood that there is an overlap in dimensions between two items when the two items are fitted together. Generally, the overlap is equal to or greater than approximately 0.0003 (three ten-thousandths) inches. Particularly, the overlap is equal to or greater than approximately 0.0005 (five ten-thousandths) inches, and more particularly, the overlap is equal to or greater than approximately 0.0010 (one one-thousandth (ten ten-thousandths)) inches and equal to or less than 0.0015 (fifteen ten-thousandths (one-and-one-half one-thousandth)) inches.

The cylinder sleeve 120 is inserted into the cylinder can 109 using a press-fit between the bottom one (1) inch of cylinder sleeve 120 and the corresponding portion of cylinder can 109, and a slip-fit between the remaining portions where cylinder sleeve 120 and cylinder can 109 join. This configuration stabilizes the cylinder sleeve 120 within the engine block 100. The slip-fit portion of this configuration helps reduce the transmission of distortions in the engine block 100 to the cylinder sleeve 120 below the level of transmitted distortions that would occur if a press-fit were used along the entire interface between cylinder sleeve 120 and cylinder can 109. Additionally, the press-fit portion of this configuration helps stabilize the cylinder sleeve 120 for thrust loads, and helps minimize the mixing of cooling and lubricating fluids by preventing either cooling or lubricating fluids from leaking between the cylinder sleeve 120 and the cylinder can 109.

Typically, to install cylinder sleeve 120, engine block 100 is heated and cylinder sleeve 120 is inserted into the cylinder can 109 using a slip-fit until the last approximately one (1) inch of travel where there is a light press-fit or an interference fit between the bottom of sleeve 120 and the bottom of cylinder can 109. Once the engine block 100 cools, a full press-fit is formed between the bottom of sleeve 120 and the bottom of cylinder can 109. In alternate embodiments, different types of fits or different combinations of fits may be used provided that adequate stabilization and sealing are achieved while minimizing transmission of distortions to the cylinder sleeves 120.

In the illustrated embodiment, the bottom surface 121 of sleeve 120 does not contact the engine block 100 (see FIG. 9). This arrangement helps avoid difficulties that may occur with tolerance stack-ups or with the different expansion rates between the cylinder sleeve 120 and the engine block 100. As an example, the cylinder sleeve 120 is vertically supported at least by the interaction between shelf 111 and upper abutment surface 122, and between top surface 107 and lower abutment surface 124. Avoiding contact between sleeve bottom surface 121 and engine block 100 helps prevent engine block 100 pushing sleeve 120 upward in a direction tending to lift sleeve 120 off of top surface 107 and shelf 111. The gap between cylinder sleeve bottom surface 121 and engine block 100 accommodates thermal expansion and contraction of the cylinder sleeve 120 and the engine block 100, thereby avoiding, or at least minimizing, interference between the cylinder sleeve bottom surface 121 and the engine block 100. In an example embodiment, the engine block 100 is made from a material with a higher coefficient of thermal expansion (e.g., 247 (7075-T6 aluminum alloy)) than the cylinder sleeves 120 (e.g., 36 (ductile iron)).

In order to prevent the escape of combustion gasses, the upper surface 127 of sleeve 120 is positioned slightly above the upper deck 106 of engine block 100 in a "step-deck" configuration. This configuration helps to ensure that more pressure is exerted on the engine head by cylinder sleeves 120 than by engine block 100 during engine operation. In the illustrated embodiment, the upper surface 127 is positioned approximately 0.002 (two-thousandths) inches above upper deck 106. In alternate embodiments, upper surface 127 may be positioned greater than 0.002 (two-thousandths) inches above upper deck 106, or between level with upper deck 106 and 0.002 (two-thousandths) inches above upper deck 106 provided that combustion gasses do not escape between the cylinder sleeve 120 and the engine head during operation.

Now referring to FIG. 10, the truss 110 is shown as being positioned within the cylinder cavity 101. The truss 110 includes a truss cross member 134, connection portions 135 with attachment surfaces 136 and coolant holes 138. In the depicted embodiment the truss 110 further includes ears 140 that extend below the truss cross member 134 and toward the bottom of the cylinder cavity 101. However, other embodiments may not include ears 140 and may instead have the truss cross member 134 extending from the top to the bottom of the truss 110 in order to accommodate various stock engine configurations.

In reference to FIGS. 4 and 10, the cylinder cavity side wall 102 of is typically left as rough cast surface following manufacture of the engine block. As such, the portions 103 of the cylinder cavity side wall 102 to which the attachment surfaces 136 attach are machined to present a suitable surface for attaching the trusses 110. In the illustrated embodiment, the truss 110 is primarily constructed of aluminum and is welded to an aluminum engine block 100. Other materials and alloys may be used to construct the truss 110 if they provide sufficient strength and the ability to be securely attached to engine block 100. Additionally, although welding is used to attach the aluminum attachment surfaces 136 to the aluminum engine block 100, in other embodiments other adhesive methods for attachment may be used, such as for example, using other molten metal or chemical methods for bonding two surfaces together.

Not only does the addition of the trusses 110 to the engine block 100 increase the strength of the engine block 110, and in particular with respect to torsional loads imparted through the engine mounts, the trusses 110 also improve the cooling of the cylinder sleeves 120. Truss 110 includes coolant holes 138, which allow coolant to pass through portions of truss 110 and between the cylinder sleeves 120. Coolant holes 138 are positioned on truss 110 such that when truss 110 is installed in cylinder cavity 101, a greater number of coolant holes 138 are positioned near the top of cylinder cavity 101 (i.e., near where the engine head attaches) than are positioned near the bottom of cylinder cavity 101. This arrangement restricts the horizontal movement of coolant in the block near the bottom of cylinder cavity 101, and directs coolant upward resulting in increased coolant flow near the top of the cylinder cavity. This redirection of the coolant enhances coolant flow near the top of cylinder sleeves 120 and increases cooling of the top portions of cylinder sleeves 120 where the heat generated by the engine tends to be highest. In the illustrated embodiment, the exhaust side 146 of truss 110 has a greater number of coolant holes 138 than the intake side 148 of truss 110 to increase cooling of the exhaust side of the cylinder cavity, which is typically hotter than the intake side.

In FIG. 10, the truss 110 is placed in the cylinder cavity 101 with a gap 142 between the bottom 114 of the truss 110 and the bottom 105 of the cylinder cavity 101. Since the surface of cylinder cavity 101 is typically rough cast and not smooth, the bottom 105 of the cylinder cavity 101 is left as a rough cast surface and the truss 110 is not attached to the bottom 105 of cylinder cavity 101 to avoid the costs associated with smoothing the bottom 105. However, in other embodiments, additional factors such as influencing coolant flow or adding strength to the engine block 100 may lead to the truss 110 being connected to the bottom of cylinder cavity 101. As an example, attaching the truss 110 to the bottom 105 of cylinder cavity 101 would greatly strengthen the main bearing journals of stock engines that have the main bearing journals aligned with the locations where trusses 110 are installed.

When installed in engine block 100, the truss 110 does not extend to the top of the cylinder cavity 101, thereby leaving a gap 144 between the top of truss 110 and the cylinder head gasket (not depicted). The gap 144 allows liquid coolant to pass over the top of the truss 110 and horizontally between the cylinder sleeves. Additionally, the gap 144 minimizes difficulties, such as the escape of combustion gasses, that may occur due to the different expansion rates between the truss 110 and the cylinder sleeve 102 as the engine heats and cools. The gap 144 further allows liquid coolant to pass vertically through any coolant holes in the engine head (not depicted) that may be positioned directly above the trusses 110. Stated differently, the gap 144 helps prevent the blockage of coolant holes directly above truss 110 by truss 110. However, in other embodiments where, for example, there are no coolant holes positioned in the engine head directly above the trusses 110, the truss 110 may extend to the top of the cylinder cavity 101 provided that adequate cooling and support are provided. In the embodiments where the truss 110 extends to the top of the cylinder cavity 101, additional cooling holes 138 may be necessary to accommodate for the absence of a cooling fluid flow path over the truss 110.

The number, location and relative distribution of the coolant holes 138 on truss 110 may be varied in alternate embodiments based on multiple factors, such as the desired strength of truss 110 and the desired coolant flow within the assembled engine.

Figure 11:
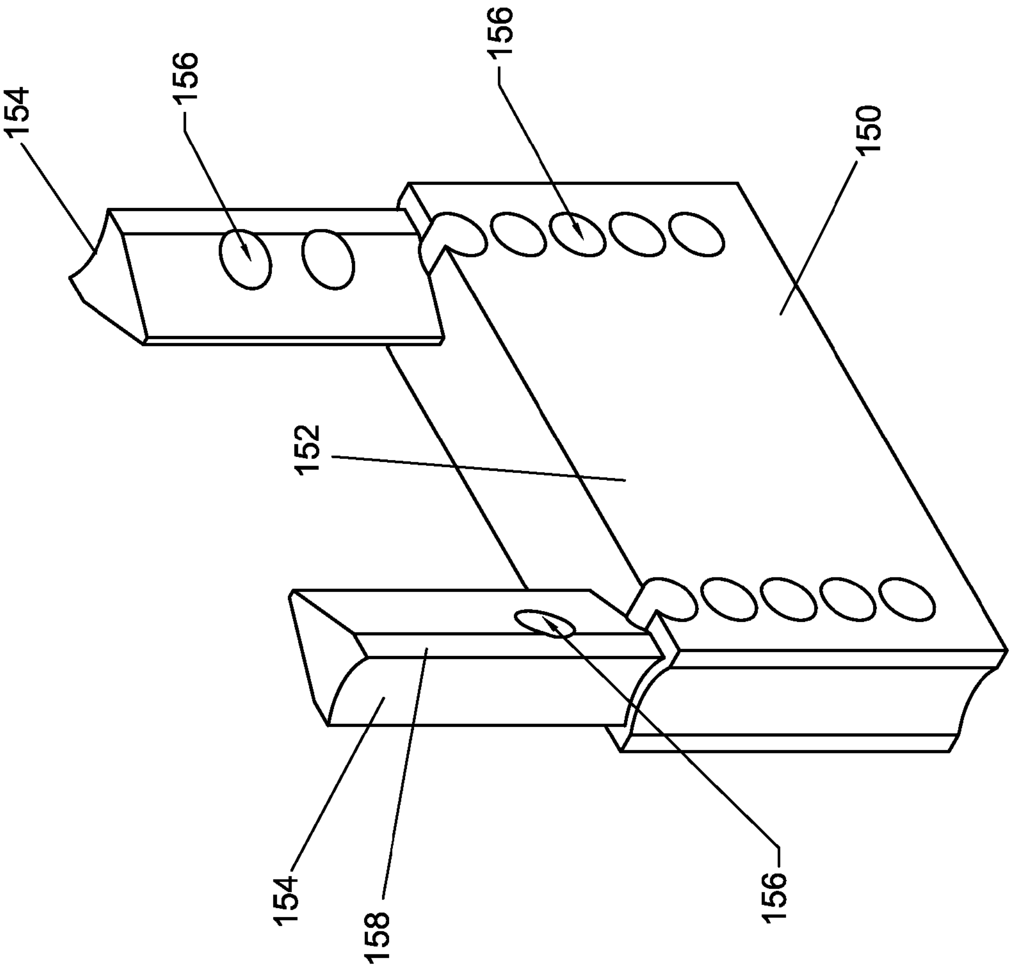
FIG. 11 is a perspective view of a support member according to another embodiment of the present invention.

Truss 150 according to another embodiment of the present invention is illustrated in FIG. 11. Truss 150 includes truss cross member 152, attachment surfaces 154, coolant holes 156 and ears 158. In this embodiment, the truss cross member 152 is relatively thick when compared to the truss cross member 134 of truss 110. The thicker truss cross member 152 increases the overall strength of truss 150. However, due to its thickness, the maximum diameter of the cylinder sleeves used in conjunction with truss 150 are restricted as compared to thinner truss cross members.

When modifying a stock engine according to an embodiment of the present invention, a stock engine block is first obtained. Either closed deck engines (such as the General Motors® LS-1 and LS-2 engines) or open deck engines may be modified in accordance with the present invention to increase their strength. Additionally, engine blocks where the cylinder cans are interconnected (known as "Siamese bore engines," for example the LS-2 engine) as well as engines where a gap exists between the cylinder cans (such as in the LS-1 engine) can be modified. Frequently automotive enthusiasts desire modification of stock high-performance engines that include, again, the LS-1 or LS-2 engines, which are installed in vehicles such as the Chevrolet Corvette®.

The steps involved in modifying a stock engine and increasing its strength according to an embodiment of the present invention include:

1. Removing, for example boring out, the stock cylinder sleeves, which are typically made of cast iron.
2. Removing, for example boring out, the upper portion of the cylinder cans, which are typically made of aluminum and surround the cylinder sleeves. The upper approximately 2.1 inches of the cylinder cans are removed during this step. The top surface 107 of the cylinder can 109 that cylinder sleeve lower block abutment surface 124 of flange 130 rests upon is created during this step. Other embodiments may remove a greater portion of the cylinder can 109 or a smaller portion of the cylinder can 109 to accommodate different stock engines provided that a sufficiently strong truss 110 can be inserted and that sufficient support is provided for the cylinder sleeves 120.
3. Forming sleeve supports 108 by removing portions of the upper deck 106. During this step shelves 111, upon which cylinder sleeve upper block abutment surfaces 122 rest after installation of cylinder sleeve 120, are created.
4. Machining the side wall portions 103 of cylinder cavity 101 into suitable receptacles for truss attachment surfaces 136.
5. Installing trusses 110 into the cylinder cavity 101. The fit between the attachment surfaces 136 of truss 110 and the side wall portions 103 in cylinder cavity 101 is an interference fit. The interference fit prevents excessive distortion of engine block 100 by preventing the side wall portions 103 from being pushed apart (which might occur if a heavy press-fit, such as an overlap equal to or greater than 0.0010 (ten ten-thousandths (one one-thousandth)) inches, is used) or pulled together (which might occur after welding trusses 110 to block 100 if a loose slip-fit, such as a gap equal to or greater than 0.0005 (five ten-thousandths) inches, is used). Other fits between trusses 110 and side wall portions 103 may be used provided that the engine block is not excessively distorted. The trusses 110 are welded to engine block 100, thereby connecting separate portions of the cylinder cavity side wall 102.
6. Relieving the internal stresses that may have been induced by the placement of the trusses 110 in the cylinder cavity 101. One method of relieving these internal stresses is to shake the entire engine block, such as by using a Meta-Lax® type device manufactured by Bonal Industries.
7. Machining and sizing the bores of the cylinder cans 109 to receive the cylinder sleeves 120.
8. Machining fine adjustments to the trusses 110 that may be required prior to installation of the cylinder sleeves 120.
9. Installing cylinder sleeves 120, which are typically made of ductile iron. Typically, to install cylinder sleeve 120, engine block 100 is heated and cylinder sleeve 120 is inserted into the cylinder can 109 with a slip-fit up to the last approximately one (1) inch of travel where there is a light press-fit or an interference fit between the bottom of sleeve 120 and the bottom of cylinder can 109. When the cylinder sleeve 120 is fully inserted into cylinder can 109, cylinder sleeve upper abutment surface 122 contacts shelf 111, and cylinder sleeve lower abutment surface 124 contacts the top surface 107 of the cylinder can 109. Once the engine block 100 cools, a full press-fit is formed between the bottom of sleeve 120 and the bottom of cylinder can 109. Other methods of installing cylinder sleeve 120 can be used, which include using an interference fit or a slip-fit, and using chemical or molten metal methods for bonding two surfaces together, provided that sufficient securement to block 100 is achieved. In the illustrated embodiment, the cylinder sleeves 120 are installed after trusses 110 since at least the truss support surfaces 112 are used as vertical supports for the bottom abutment surfaces 131 of upper cylinder sleeves flanges 132.
10. Relieving the internal stresses that may have resulted from the installation of the cylinder sleeves 120, such as by performing a stress relief shake of the modified engine block 100.

11. Machining flat the upper deck of the modified engine to receive the head gasket and engine head.
12. Boring the cylinder sleeves 120 on the desired size.
13. Honing the surfaces of cylinder sleeve 120 to a smoothness required for proper operation.

It should be appreciated that modifications to the above sequence may be made, including the addition or deletion of steps and the reordering of steps, while remaining within the scope of the present invention.

Figure 12:
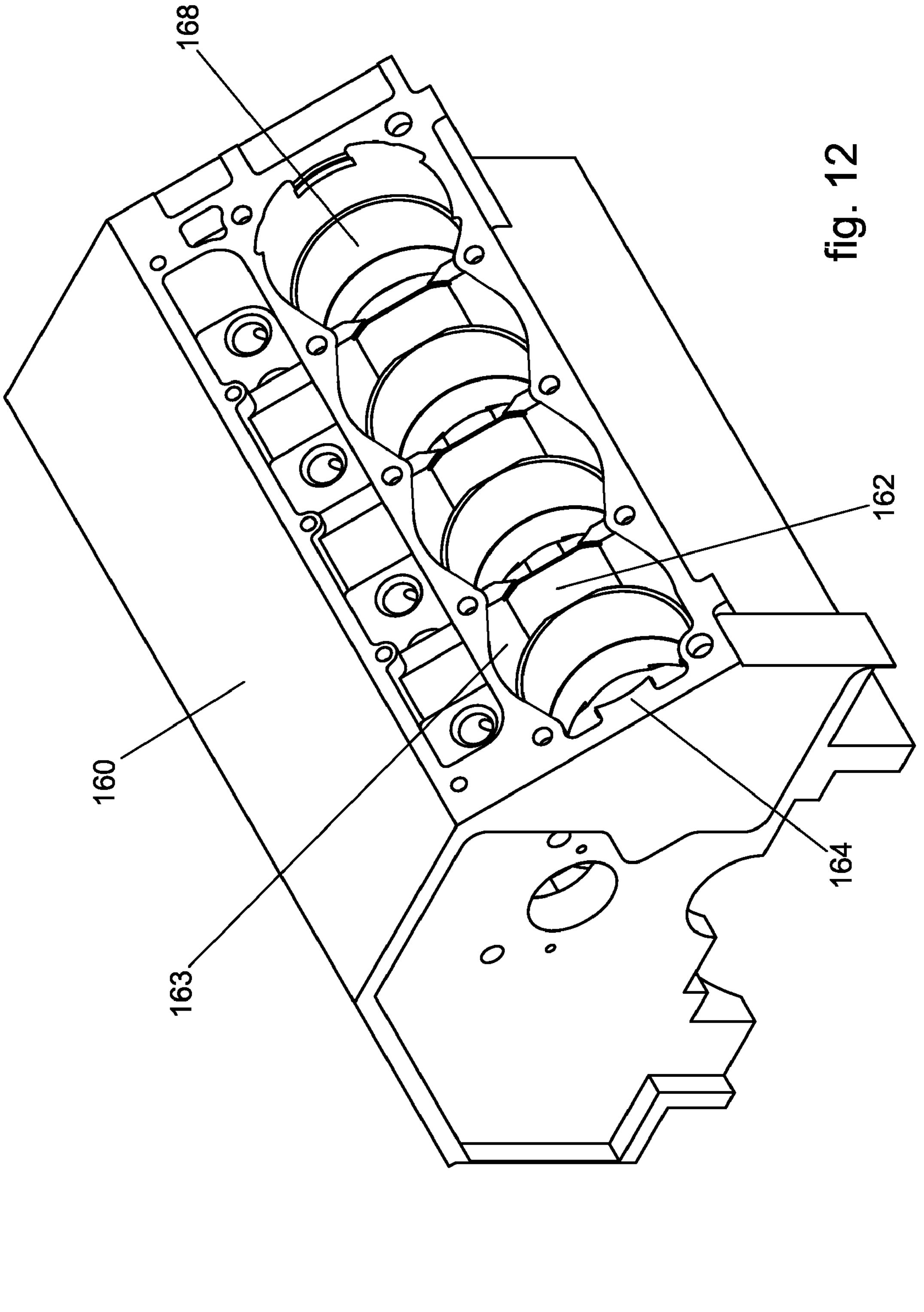
FIG. 12 is a perspective view of an engine block according to still another embodiment of the present invention.
Figure 13:
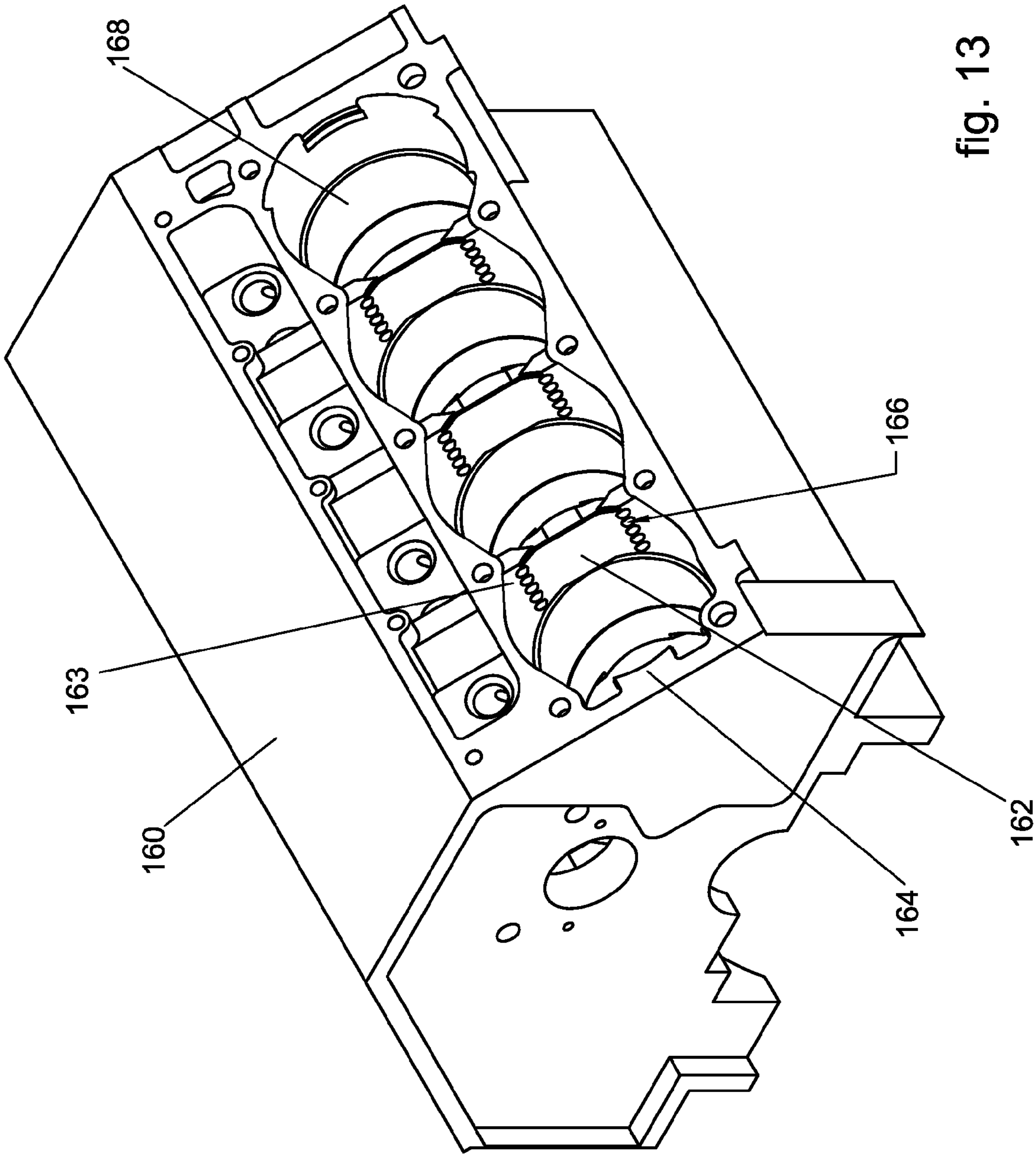
FIG. 13 is a persecutive view of the engine block depicted in FIG. 12 with coolant holes.

In still another embodiment of the current invention as depicted in FIG. 12, an engine block 160 is cast with the support members, for example cylinder cavity cross members 162, as part of the original casting. Engine block 160 includes elements analogous to the modifications made to engine block 100, for example, cylinder cavity cross members 162, connection portions 163, sleeve supports 164, and cylinder cans 168. Post-casting modification or machining may be performed to attain the final configuration. For example, referring to FIG. 13, to achieve the final overall shape of cylinder cavity cross members 162, coolant holes 166 may be machined into cylinder cavity cross members 162 after the casting of engine block 160. In yet another embodiment, the engine block is cast with coolant holes 166 included. Additionally, engine block 160 is depicted as a modified close deck engine block, although other embodiments include open deck engine blocks with internal supports similar to cylinder cavity cross members 162.

While one or more illustrated examples, representative embodiments and specific forms of the invention have been illustrated and described in detail in the drawings and foregoing description, the same is to be considered as illustrative and not restrictive or limiting. Any of the foregoing aspects of the present invention may be used in combination with other features, whether or not explicitly described as such. Dimensions, whether used explicitly or implicitly, are not intended to be limiting and may be altered as would be understood by one of ordinary skill in the art. Only exemplary embodiments have been shown and described, and all changes and modifications that come within the spirit of the invention are desired to be protected.

What is claimed is:

1. An engine block for a reciprocating piston internal combustion engine with combustion cylinders, the engine block comprising:

an upper deck for attaching an engine head, said upper deck defining a plane;

a cylinder cavity wall below said upper deck plane and surrounding first and second combustion chamber locations, wherein said first combustion chamber location is surrounded by a first combustion cylinder when the first combustion cylinder is attached to the engine block, and wherein said second combustion chamber location is surrounded by a second combustion cylinder when the second combustion cylinder is attached to the engine block; and a first cylinder cavity cross member extending from a first cylinder cavity wall portion to a second cylinder cavity wall portion spaced from the first wall portion, said first cross member extending between said first and second combustion chamber locations, wherein said first cross member includes portions of said cylinder cavity wall, and wherein said first cross member enables coolant flow between the first and second combustion cylinders when the first and second combustion cylinders are attached to the engine block, wherein the first cylinder cavity cross member is attached to the engine block after the engine block is cast.

2. The engine block of claim 1, wherein said cylinder cavity is a coolant chamber in which liquid coolant circulates when the engine block is included in an operating engine.

3. The engine block of claim 2, wherein said first cross member includes an upper surface, and said first cross member upper surface is spaced below said upper deck plane enabling coolant flow over said first cross member upper surface.

4. The engine block of claim 2, wherein said first cross member includes coolant holes for circulating liquid coolant.

5. The engine block of claim 4, wherein said first cross member includes upper and lower surfaces, and wherein the coolant holes located near said upper surface are more closely spaced than the coolant holes near said lower surface.

6. The engine block of claim 4, wherein said cylinder cavity includes an intake side and an exhaust side, and wherein more coolant holes are located on the portion of the first cross member located on said exhaust side than on the portion of said first cross member on said intake side.

7. The engine block of claim 1, wherein said first cylinder cavity cross member is substantially planar.

8. The engine block of claim 1, wherein said cylinder cavity wall surrounds a third combustion chamber location, and wherein said third combustion chamber location is surrounded by a third combustion cylinder when the third combustion cylinder is attached to the engine block, the engine block further comprising:

a second cylinder cavity cross member extending from a third cylinder cavity wall portion to a fourth cylinder cavity wall portion spaced from the third wall portion, said second cross member extending between said second and third combustion chamber locations, said second cross member including portions of said cylinder cavity wall, and wherein said second cross member enables coolant flow between said second and third combustion cylinders when the second and third combustion cylinders are attached to the engine block.

9. The engine block of claim 1, wherein the combustion cylinders include cylinder sleeves, and said first cross member vertically supports at least one cylinder sleeve in a direction perpendicular to said upper deck plane and toward an engine head when the at least one cylinder sleeve and the engine head are operably attached to the engine block.

10. The engine block of claim 1, wherein portions of said combustion cylinder locations contact one another.

11. An engine block for a reciprocating piston internal combustion engine with combustion cylinders, the engine block comprising:

an upper deck for attaching an engine head, said upper deck defining a plane;

a cylinder cavity wall below said upper deck plane and surrounding first and second combustion chamber locations, wherein said first combustion chamber location is surrounded by a first combustion cylinder when the first combustion cylinder is attached to the engine block, and wherein said second combustion chamber location is surrounded by a second combustion cylinder when the second combustion cylinder is attached to the engine block; and a first cylinder cavity cross member extending from a first cylinder cavity wall portion to a second cylinder cavity wall portion spaced from the first wall portion, said first cross member extending between said first and second combustion chamber locations, wherein said first cross member includes portions of said cylinder cavity wall, and wherein said first cross member enables coolant flow between the first and second combustion cylinders when the first and second combustion cylinders are attached to the engine block, wherein said first cylinder cavity cross member is formed as a cast part of the engine block.

12. An engine block for a reciprocating piston internal combustion engine, the engine block comprising:

an upper deck with an elongated upwardly-opening cylinder cavity including a generally upstanding wall surrounding at least two combustion cylinders, the wall having an upper end portion, a lower end portion, and side portions; and a first transverse support wall between said upper and lower end portions and extending from a first side portion of said side wall, between the combustion cylinders, and to a second side portion of said side wall facing said first side portion, said support wall providing a rigid connection between said first and second side wall portions, wherein the support wall is an integral cast portion of the engine block.

13. The engine block of claim 12, wherein said support wall has first and second ends fused respectively to said first and second side portions of said side wall.

14. The engine block of claim 12, wherein said first transverse support wall is spaced below the cylinder cavity wall upper end portion and spaced above the cylinder cavity wall lower end portion.

15. The engine block of claim 12, further comprising a second transverse support wall between said cylinder cavity wall upper and lower end portions and further spaced from said first transverse support wall, said second transverse support wall extending from a third side portion of said side wall, between a third combustion cylinder and one of the two combustion cylinders, and to a fourth side portion of said side wall facing said third side portion, said second transverse support wall providing a rigid connection between said third and fourth side wall portions.

16. The engine block of claim 12, wherein the upper deck defines an upper plane and at least one of the combustion cylinders has a lower surface defining a lower plane substantially parallel to the upper plane and said facing side wall portions of said cylinder cavity are located at least in part between the upper plane and the lower plane, and wherein said transverse support wall structurally connects said facing side wall portions.

17. An apparatus for internally supporting an engine block for a reciprocating piston internal combustion engine, wherein the engine block includes an upper deck and a coolant chamber, the upper deck defining an upper plane and the coolant chamber including a side wall surrounding at least one cylinder sleeve, wherein the cylinder sleeve has a lower surface defining a lower plane substantially parallel to the upper plane, the apparatus comprising:

a first support member with two connection portions, wherein said connection portions are configured and adapted to connect said first support member to two spaced apart coolant chamber side wall portions, the two spaced apart coolant chamber side wall portions located at least in part between the upper plane and the lower plane, and wherein said first support member structurally connects the two spaced apart coolant chamber side wall portions when said connection portions are connected to the two spaced apart coolant chamber side wall portion, wherein the connection portions individually include an attachment surface, wherein said attachment surfaces are configured to be attached to the two spaced apart coolant chamber side wall portions after the engine block is cast.

18. The apparatus of claim 17, wherein said connection position are configured to be welded to the two spaced apart coolant chamber side wall portions.

19. The apparatus of claim 17, further comprising:

a second support member with two connection portions, wherein said second support member connection portions are configured and adapted to connect said second support member to two additional spaced apart coolant chamber side wall portions, the two additional spaced apart coolant chamber side wall portions located at least in part between the upper plane and the lower plane, and wherein said second support member structurally connects the two additional spaced apart coolant chamber said wall portions when said second support member connection portions are connected to the two additional spaced apart coolant chamber side wall portions;

wherein said first support member is configured to at least partially separate two cylinder sleeves when the cylinder sleeves are operatively attached to the engine block; and wherein said second support member is configured to at least partially separate two cylinder sleeves when the cylinder sleeves are operatively attached to he engine block.

20. The apparatus of claim 19, wherein said first support member is configured to enable coolant flow between the two cylinder sleeves said first support member at least partially separates, and wherein said second support member is configured to enable coolant flow between the two cylinder sleeves said second support member at least partially separates.

21. The apparatus of claim 17, wherein said first support member includes an upper surface configured to be below the upper plane, said first support member being configured to enable coolant to flow between said first support member and the upper plane.

22. The apparatus of claim 17, wherein the coolant chamber has a bottom surface opposite the upper deck, and wherein said first support member is configured to be separated from said coolant chamber bottom surface.

23. The apparatus of claim 17, wherein said first support member includes a cylinder sleeve support surface, and wherein said cylinder sleeve support surface is configured to vertically support at least one cylinder sleeve in a direction perpendicular to the upper deck plane and toward an engine head when the at least one cylinder sleeve and the engine head are operably attached to the engine block.

24. An apparatus for internally supporting an engine block for a reciprocating piston internal combustion engine, wherein the engine block includes an upper deck and a coolant chamber, the upper deck defining an upper plane and the coolant chamber including a side wall surrounding at least one cylinder sleeve, wherein the cylinder sleeve has a lower surface defining a lower plane substantially parallel to the upper plane, the apparatus comprising:

a first support member with two connection portions, wherein said connection portions are configured and adapted to connect said first support member to two spaced apart coolant chamber side wall portions, the two spaced apart coolant chamber side wall portions located at least in part between the upper plane and the lower plane, and wherein said first support member structurally connects the two spaced apart coolant chamber side wall portions when said connection portions are connected to the two spaced apart coolant chamber side wall portion, wherein said first support member is formed as a cast portion of the engine block.

25. The apparatus of claim 17, wherein said first support member is configured to separate at least portions of two cylinder sleeves when the cylinder sleeves are operatively attached to the engine block.

26. The apparatus of claim 25, wherein said first support member includes holes to enable coolant flow between the two cylinder sleeves.

27. The apparatus of claim 26, wherein said first support member includes an upper portion configured to be adjacent the upper deck and a lower portion opposite said upper portion, and wherein said holes are more closely spaced near said upper portion than near said lower portion.

28. The apparatus of claim 26, wherein the cylinder sleeve includes an exhaust side and an intake side and said first support member has corresponding exhaust and intake sides, and wherein said first support member exhaust side includes more holes than said first support member intake side.

29. A method for modifying a reciprocating piston internal combustion engine block after the engine block has been formed, the engine block comprising a cylinder cavity, a cylinder cavity side wall, and an upper deck, the cylinder cavity side wall surrounding at least two combustion cylinders and the upper deck configured for connection to an engine head, the method comprising:

modifying the engine block by:

attaching a support member first attachment surface to a first cylinder cavity side wall portion, wherein the support member further includes a support member second attachment surface;

attaching the support member second attachment surface to a second cylinder cavity side wall portion different from the first cylinder cavity side wall portion; and attaching at least two cylinder sleeves to the engine block, wherein the at least two cylinder sleeves are separated at least in part by the support member.

30. The method of claim 29, further comprising vertically supporting the at least two cylinder sleeves in an upward direction toward a cylinder head attached to the upper deck.

31. The method of claim 29, further comprising removing at least a portion of two combustion cylinders from the engine block, wherein said removing occurs prior to said attaching at least two cylinder sleeves to the engine block.

32. The method of claim 29, wherein said attaching the support member first attachment surface includes positioning the support member within the cylinder cavity with an interference fit between the first attachment surface and the first cylinder cavity side wall portion.

33. The method of claim 29, further comprising removing portions of said engine block, wherein said removing includes forming cylinder sleeve support surfaces for vertically supporting the at least two cylinder sleeves in an upward direction toward a cylinder head attached to the upper deck.

34. The method of claim 29, further comprising removing a portion of the cylinder cavity side wall to provide a surface suitable for attaching the support member first attachment surface.

35. The method of claim 29, further comprising forming coolant holes in the support member, wherein the coolant holes enable coolant flow in the cylinder cavity after said attaching the support member first surface.

* * * * *

UNITED STATES PATENT AND TRADEMARK OFFICE

CERTIFICATE OF CORRECTION

PATENT NO. : 7,513,237 B1
APPLICATION NO. : 11/763718
DATED : April 7, 2009
INVENTOR(S) : Jeffrey W. Liebert It is certified that error appears in the above-identified patent and that said Letters Patent is hereby corrected as shown below:

In claim 17, column 15, line 65, “portion,” should read --portions,--.

In claim 18, column 16, line 5, “position” should read --portions--.

In claim 19, column 16, line 26, “he” should read --the--.

In claim 24, column 17, line 3, “portion,” should read --portions,--.

Signed and Sealed this

Seventh Day of July, 2009

JOHN DOLL
*Acting Director of the United States Patent and Trademark Office*